United States Patent [19]

Ashida

[11] Patent Number: 4,908,161

[45] Date of Patent: Mar. 13, 1990

[54] FIRE RETARDANT FOR ISOCYANATE-BASED FOAMS COMPRISING AMMONIUM SULFATE AND A CYANURIC ACID DERIVATIVE

[75] Inventor: Kaneyoshi Ashida, Farmington Hills, Mich.

[73] Assignee: Harry Fischer, Ontario, Canada

[21] Appl. No.: 210,748

[22] Filed: Jun. 23, 1988

[51] Int. Cl.$^4$ .......................... C09K 2/10; C08G 18/08
[52] U.S. Cl. ..................... 252/609; 252/601; 252/7; 252/3; 521/120; 521/123; 521/128; 423/545; 528/48; 528/52
[58] Field of Search ............... 521/120, 123, 128; 423/545; 252/609; 528/48, 52

[56] References Cited

U.S. PATENT DOCUMENTS

| | | | |
|---|---|---|---|
| 2,881,088 | 4/1959 | Schulenburg | 427/385.5 |
| 3,737,400 | 6/1973 | Kumusaka et al. | 427/385.5 |
| 4,272,414 | 6/1981 | Vandersall | 252/602 |
| 4,301,217 | 11/1981 | Rohringer et al. | 428/528 |
| 4,419,401 | 12/1983 | Pearson | 428/262 |
| 4,436,841 | 3/1984 | Rasshofer et al. | 521/106 |
| 4,486,468 | 12/1984 | Gray | 427/181 |
| 4,552,803 | 11/1985 | Pearson | 428/262 |
| 4,582,524 | 4/1986 | Lokitz | 71/27 |
| 4,723,959 | 2/1988 | Miyamachi et al. | 8/115.7 |

FOREIGN PATENT DOCUMENTS

| | | | |
|---|---|---|---|
| 539301 | 4/1957 | Canada | 252/609 |
| 2035072 | 1/1972 | Fed. Rep. of Germany | 521/120 |
| 2161690 | 7/1973 | Fed. Rep. of Germany | 521/120 |
| 2542048 | 3/1977 | Fed. Rep. of Germany | 521/120 |
| 49-134999 | 5/1973 | Japan | 252/609 |

*Primary Examiner*—John Kight
*Assistant Examiner*—Dennis R. Daley
*Attorney, Agent, or Firm*—Arnold S. Weintraub

[57] ABSTRACT

Ammonium sulfate powder is employed, alone, or in conjunction with a weakly basic powder to neuturalize the acidity of the sulfate, as a flame retardant for isocyanate-based foams and, in particular, rigid and flexible polyurethane foams.

5 Claims, No Drawings

FIRE RETARDANT FOR ISOCYANATE-BASED FOAMS COMPRISING AMMONIUM SULFATE AND A CYANURIC ACID DERIVATIVE

BACKGROUND OF THE INVENTION

1. Field of the Invention

The present invention relates to fire retardants for isocyanate-based foams. More particularly, the present invention concerns fire retardants for flexible or rigid isocyanate-based foams. Even more particularly, the present invention concerns fire retardants for flexible and/or rigid polyurethane foams.

2. Prior Art

The demand for very efficient additives to lower the combustibility of flame-retardant flexible urethane foams has strongly increased in recent years because of stricter fire regulations and the general, overall, need for safety. Thus, much effort has been devoted to providing flame retardant synthetic resinous products, as well as improved fire retardants, per se. This is especially true with respect to isocyanate-based foams, such as polyurethanes, polyisocyanurates and the like which are such an integral part of our every day surroundings. Thus, the art has produced many so-called "flame retardant" polyurethanes, polyisocyanurates, etc. Yet, upon close scrutiny, many of these so-called flame retardant foams have inherent drawbacks.

For example, so-called flame retardant flexible polyurethane foams have been prepared by the addition of halogen- and/or phosphorous-containing flame retardants. While these foams pass small scale fire tests, they do not reflect actual fire conditions. Therefore, the tests can be used only as laboratory scale methods for screening.

Further, the foams classified as self-extinguishing foams (SE foams) as determined by the ASTM D-1692-59T test are flammable under actual fire conditions.

Another proposed method of making flame retardant flexible foams is high resilience foams (HR foams) which have lower melting points than conventional flexible urethane foams. These foams are prepared by using a blended polyisocyanate, e.g., 80%/20% mixture of TDI and polymeric MDI. The low melting points of the foams result in a dripping phenomenon which prevents flame propagation. Accordingly, the foams also can be classified as SE foams by the ASTM D-1692-59T, but these foams also are substantially flammable at actual fire conditions.

Substantially non-combustible flexible foams can be produced only by the addition of extremely large amounts of power-type flame retardants, and not by liquid type flame retardants.

The first commercial product of this type is a CMHR foam (combustion modified high resilience foam) developed by Mobay Chemical Corp. (J. F. Szabat and J. A. Gaetano, Proceedings of the SPI International Technical/Marketing Conference, Nov. 2-5, 1983, San Diego, pp. 326-331). This type of foam employs alumina trihydrate as the major flame retardant.

Additionally, in recent years, many types of nitrogen-containing compounds have been proposed as powder-type flame retardants for flexible and rigid urethane foams. Melamine pyrophosphate has been used for rigid urethane foams, as disclosed in U.S. Pat. No. 4,003,861. Melamine-phenolphosphonic acid salt has been used for flexible foams, as described in U.S. Pat. No. 4,061,605. Also, in U.S. Pat. No. 4,139,501 methylolmelamine alkyl ethers have been taught as flame retardants for flexible urethane foams. Melamine has been disclosed for rigid urethane foams in U.S. Pat. No. 4,221,875. Cyanuric acid derivatives, such as cyanamid, dicyandiamide, guanidine, biguanidine, and melamine have been disclosed as flame retardants for flexible urethane foams, as taught in U.S. Pat. No. 4,258,141.

Melamine-formaldehyde precondensates as flame retardants for flexible urethane foams are taught in U.S. Pat. No. 4,334,971. An intumescent composition, including melamine, for use in flexible urethane foams has been taught in U.S. Pat. No. 4,317,881, as well as urea or melamine as taught in U.S. Pat. No. 4,385,151. Other flame retardants are taught in U.S. Pat. No. 4,367,294; U.S. Pat. No. 4,369,268 and U.S. Pat. No. 4,454,254.

In contrast to the organic based flame retardants of the prior art, the present invention is based on the finding that ammonium sulfate is an unexpectedly effective flame retardant for active-hydrogen containing isocyanate-based foams.

Ammonium sulfate is an inexpensive chemical ordinarily used as a fertilizer. However, Applicant is unaware of any teaching of ammonium sulfate as a flame retardant for urethane foams and the like.

SUMMARY OF THE INVENTION

In accordance with the present invention flame retardant isocyanate-based foams and, in particular, flexible and rigid polyurethane foams are prepared by the incorporation thereinto of ammonium sulfate, as a fire retardant.

The ammonium sulfate is, preferably, employed in powdered form. Because of the acidic nature of the sulfate, it is, ordinarily, admixed with a weakly basic powder to preclude adverse foam rise times.

Useful weakly basic powders include (a) alkali earth metal hydroxides, or (b) cyanuric acid derivatives, such as, cyanamide, melamine, and the like, as well as mixtures thereof. Generally, from about 5 to about 100 parts per weight of weakly basic powder per 100 parts per weight of ammonium sulfate is employed.

The fire retardant is incorporated into the foam formulation by any conventional technique, such as by mixing or the like. While being pre-eminently useful in the formation of flexible polyurethane foams, the fire retardant is, also, useful with rigid polyurethane foams, polyisocyanurate foams, carbodiimide foams and the like.

For a more complete understanding of the present invention reference is made to the following detailed description and accompanying examples.

DESCRIPTION OF THE PREFERRED EMBODIMENTS

In accordance with the present invention and, as noted above, fire retardant active-hydrogen containing isocyanate-based foams are prepared by employing, as the fire retardant, ammonium sulfate. This result was completely unexpected in that ammonium sulfate, being acidic in nature, would be expected to impede foam formation.

As is known to those skilled in the art to which the present invention pertains, ammonium sulfate is a widely known, commercially available solid inorganic chemical, usually employed as a fertilizer. It is water soluble and has a pH below 6.0. It has been found, however, that when used herein as a fine powder form, it is not water-soluble due to it being coated with urethane polymer or the like.

Because of the acidic nature of the ammonium sulfate, it is advantageous to admix the ammonium sulfate with a weakly basic powder. Useful weakly basic powder include (a) alkali earth metal hydroxides, (b) a cyanuric acid derivative thereof, as well as (c) mixtures thereof. Representative of the alkali earth metal hydroxide powders are magnesium hydroxide, calcium hydroxide, strontium hydroxide, barium hydroxide and mixtures thereof.

Useful derivatives of cyanuric acid include cyanamide, dicyandiamide, melamine, guanidine, biguanidine and the like and mixtures thereof.

Ordinarily, the weakly basic powder is employed in an amount ranging from about 5 parts to about 100 parts by weight thereof per 100 parts of ammonium sulfate. Preferably, the weakly basic powder is employed in an amount ranging from about 10 to 30 parts by weight thereof per 100 parts by weight of ammonium sulfate. It should be noted, though, that these amounts can be varied, as required, by the foam formulation employed.

The use of ammonium sulfate as a flame retardant is particularly advantageous in the formation of flame retardant flexible polyurethane foams.

Generally, flexible polyurethane foams are prepared by the reaction of an organic polyisocyanate with a polyhydric compound in the presence of catalyst, a surfactant and a suitable blowing agent, such as water, a halohydrocarbon or the like, as well as mixtures thereof.

Useful organic polyisocyanates for the preparation of urethane foams can be represented by the formula:

$$R(NCO)_z$$

wherein R is a polyvalent organic radical selected from the group consisting of aromatic, arylalkyl and alkylaryl organic radicals, as well as mixtures thereof; and Z is an integer corresponding to the valence number of R and is at least 2. Representative of the organic polyisocyanates contemplated herein include for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, the aromatic tetraisocyanates such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene-1,6-diisocyanate, lysine diisocyanate methylester, isophorone diisocyanate, 2,4,4-trimethylhexamethylene-1,6-diisocyanate and the like, and mixtures thereof. Other useful organic polyisocyanates include: hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethyl-4,4'-biphenyl diisocyanate, 3,3'-dimethyl-4,4'-biphenyl diisocyanate, and 3,3'-dimethyldiphenylmethane-4,4'diisocyanate, and the like.

These polyisocyanates are prepared by conventional methods in the art such as the phosgenation of the corresponding organic amine.

Still another class of organic polyisocyanate useful herein are isocyanate-terminated quasi-prepolymers. These quasi-prepolymers are prepared by reacting excess organic polyisocyanate or mixtures thereof with a minor amount of an active hydrogen-containing compound. Suitable active hydrogen-containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; as well as mixtures thereof. Compounds which contain two or more different groups within the above-defined classes may also be used such as, for example, compounds which contain one —SH group and —OH group.

Still another class of useful polyisocyanates are carbodiimide-modified MDI; allophanate-modified TDI, urea-modified TDI, as well as oxazolidone-modified TDI.

Aliphatic polyisocyanates, generally, are not suited for use herein because of their slow reaction rates.

In use herein, it is preferred that the isocyanate have an isocyanate index of from about 90 to about 120.

Among the useful polyhydric compounds are both polyester and polyether polyols.

Any suitable hydroxyl-containing polyester may be used such as are obtained, for example, from polycarboxylic acids and polyhydric alcohols. Any suitable polycarboxylic acid may be used as oxalic acid, malonic acid, succinic acid, glutaric acid, adipic acid, pimelic acid, suberic acid, azelaic acid, sebaic acid, brassylic acid, thapsic acid, maleic acid, fumaric acid, glutaconic acid, β-hydromuconic acid, α-hydromuconic acid, butyl-α-ethylglutaric acid, α,β-diethyl-succinic acid, phthalic acid, isophthalic acid, terephthalic acid, hemimetllitic acid, and 1,4-cyclohexanedicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1-5pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl) propane, commonly known as Bisphenol A.

Other types of useful polyesters include lactone-based polyesters, such as those prepared by the ring polymerization of lactones, e.g. E-caprolactone.

Any suitable polyalkylene polyether polyol may be used such as the polymerization product of an alkylene oxide with a polyhydric alcohol. Any suitable polyhydric alcohol may be used such as those disclosed above for use in the preparation of hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide tetrahydrofuran blends; epihalohydrins such as epichlorohydrin; as well as aralkylene oxides such as styrene oxide. The polyalkylene polyether polyols may have either primary or secondary hydroxyl groups, and preferably, are polyethers prepared from alkylene oxides having from two to six carbon atoms such as polyethylene ether glycols, polypropylene ether glycols, and polybutylene ether glycols. The polyalkylene polyether polyols may be prepared by any known process, such as, for example, the process disclosed in Wurtz in 1859 and Encyclopedia of Chemical Technology, vol. 7, pp. 257-262, published by Interscience Publishers, Inc. (1957) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxy-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyol. Acids of phosphorus which may be used are acids having a $P_2O_5$ equivalency of from about 72 percent to about 95 percent. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol, alkene thiols such as 2-butene-1,4-dithiol, and alkyne thiols such as 3-hexyne-1,6-dithiol.

Other compounds which do not necessarily fit within any of the previously set forth classes of compounds which are quite suitable in the production of these other quasi-prepolymers compounds include the hydroxy-terminated polyurethane polymers such as a hydroxy-terminated polymer made by reacting the isocyanate with several moles of an alkylene glycol.

Polymeric polyols such as those which are prepared by grafting styrene and/or acrylonitrile with polyether polyols can also be used, as well as polyurea dispersion polyols.

In practicing the present invention the preferable functionality of the polyols are in a range of between about 2 and 3, and their preferable hydroxyl equivalent weights are in a range of about 1,000 and 2,000, and have a hydroxyl number between about 25 and 56.

In preparing flexible polyurethane foams, a chemical or physical blowing agent may be used.

Chemical blowing agents include, for example, water, crystal water-containing inorganic or organic salts, such as sodium sulfate decahydrate, sodium borate decahydrate and the like. Organic blowing agents such as nitroethane, acetaldoxime, boric acid and the like may, also, be used. These blowing agents are described in the book "International Progress in Urethanes", V. 2, page 153, edited by K. Ashida and K. C. Frisch and published by Technomic Publishing Co., Inc. (1980).

The physical blowing agents are the halohydrocarbon blowing agents which include chlorofluorocarbons, such as trichloromonofluoromethane, hydrochlorofluorocarbons, such as dichlorotrifluoroethane, alkylene chlorides, such as methylene chloride, and the like.

Also, pentane may be used as a blowing agent. Usually, the blowing agent is present in an amount ranging from about 1 to about 50 parts, by weight thereof per 100 parts by weight of polyhydric compound.

The catalysts employed herein are the conventional catalysts used for making polyurethane foams. The catalysts include both tin catalysts and tertiary amine catalysts. Representative tin catalysts are dibutyltin dilauate and stannous octoate. Commonly used tertiary amine catalysts include N-methylmorphorine, N,N,N',N'-tetramethylpropylene diamine, 1,4-diazabicyclo [2,2,2] octane, (DABCO), 1,8-diazabicyclo[5,4,0] undecene-7 and its salts such as the phenol salt, 2-ethylhexanoic acid salt and the like. The catalyst is employed in catalytic amounts ranging from about 1 to 5 parts by weight thereof per 100 parts by weight of polyhydric compound.

The silicone surfactants used for the preparation of the flexible foams are well known and commercially available. Generally, they are polysiloxane-polyoxyalkylene block copolymers which are either linear or pendant block copolymers. Representative of this type of surfactant are those sold commercially by Dow Chemical under the name DC-193 and the like. Ordinarily, from about 0.1 to about 3.0 parts, by weight, of surfactant per 100 parts by weight of polyhydric compound are employed.

In preparing flexible polyurethane foams in accordance herewith, the preferred polyhydric compounds are polyether polyols and, in particular, the styrene and/or acrylonitrile grafted polyether polyols.

The preferred polyisocyanates are toluene diisocyanate, carbodiimide-modified diphenylmethane diisocyanate, and mixtures thereof.

Ordinarily, the polyisocyanate and polyhydric compound are employed in an NCO/OH equivalent weight ratio ranging from about 0.9 to about 1.2.

In preparing polyurethane foams, the amount of ammonium sulfate required to impart flame retardancy can be calculated on the amount of polyhydric compound employed. Usually, at least 50 parts by weight of polyhydric compound per 100 parts by weight of polyhydric compound is employed. Preferably, from about 50 to about 150 parts by weight of ammonium sulfate powder per 100 parts by weight of polyhydric compound is employed.

The flexible foams are usually prepared at ambient conditions by adding the polyol, catalyst, surfactant, blowing agent and flame retardant, as one component, to the isocyanate and water, using conventional techniques.

In preparing rigid foams water, as a blowing agent, is usually eliminated as an ingredient to preclude the liberation of carbon dioxide.

As noted, the present flame retardant can be used for the manufacture of other active-hydrogen containing isocyanate-based foams, such as polyol-containing isocyanurate foams, isocyanurate-modified polyurethane foams, modified-carbodiimide foams, carbodiimide-isocyanurate foams and the like.

For a more complete understanding of the present invention reference is made to the following illustrative examples. In the examples, all parts are by weight absent indications to the contrary.

In the examples, the following ingredients were employed:

| Ingredient | Composition | Eq. Wt. | Source, Trade Name |
|---|---|---|---|
| ASF | Ammonium sulfate | 2,000. | Aldrich |
| Polyol-1 | PAN- and PS-grafted polymer polyol | 2,000. | Union Carbide N1AX 34-28 |
| Polyol-2 | PAN- and PS-grafted polymer polyol | 2,000. | Pluracol 1003. BASF |
| Polyol-3 | Primary OH-capped polyether polyol | 2,000. | Dow Chemical. Voranol 3601 |
| L-540 | Silicone surfactant | | UCC |
| Catalyst 1 | Triethylene diamine in dipropylene glycol (1:2 vol.) | | Air Products |
| Catalyst 2 | Dibutyltin dilaurate | | Air Products |
| Catalyst 3 | Teriary amine catalyst | | |
| R-11A | Trichloro-monofluoromethane | | |
| TDI-80 | Toluene diisocyanate | 87 | |
| Isocyanate 2 | Carbodiimide-modified diphenylmethane diisocyanate | 144 | Dow Chemical, Isonate 143L |
| Isocyanate 3 | Crude MDI | | Upjohn, PAPI 27 |
| Melamine | Melamine | | |
| Ca(OH)2 | Calcium hydroxide | | |
| Ba(OH)2 | Barium hydroxide | | |
| Mg(OH)2 | Magnesium hydroxide | | |
| Al(OH)3 | Aluminum hydroxide | | |

In evaluating the foams for flame retardancy the following test methods were employed:

II. Testing Methods Employed

The testing methods employed for the evaluation of flame retardance or substantial non-flammability were shown below:
(a) Limited Oxygen Index: ASTM D-2863
(b) Butler Chimney Flammability: ASTM D-3014
(c) Foam Density: ASTM D-3574

EXAMPLE I

This example illustrates the preparation of a flexible polyurethane foam in accordance herewith. Using a suitable reaction vessel, with stirring, and at ambient conditions, various ingredients were added thereto and foam formation was observed.

Table I sets forth the ingredients and the observed physical properties.

TABLE I

| | Formulation | |
|---|---|---|
| Ingredient | A Amt, pbw | B Amt, pbw |
| Polyol 2 | 100 | 100 |
| ASF | 100 | 100 |
| L-540 | 1.4 | 1.4 |
| Catalyst 1 | 0.16 | 0.16 |
| Catalyst 3 | 0.06 | 0.06 |
| Catalyst 2 | 0.10 | 0.10 |
| Water | 2.40 | 2.40 |
| R-11A | 8.0 | 8.0 |
| TDI-80 | 30.3 | 30.3 |

TABLE I-continued

| | Formulation | |
|---|---|---|
| Ingredient | A Amt, pbw | B Amt, pbw |
| Isocyanate Index | 110 | 110 |
| Processing | | |
| Cream Time, sec. | 30" | 15" |
| Rise Time, min/sec. | 10' | 8' |
| Tack Free Time, min. | >60 | >60 |
| Appearance | GOOD | GOOD |

It is to be seen that while good foams are prepared using the sulfate, alone, the rise times were too slow.

EXAMPLE II

This example illustrates the usage of a weakly basic powder with the ammonium sulfate. In this example the weakly basic powder, melamine, was dispersed with the ammonium sulfate in the polyol and maintained at 70° C., with stirring, for about 15 hours prior to use.

Table II below sets forth the ingredients used and the resulting physical properties.

TABLE II

| | Formulation | | |
|---|---|---|---|
| Ingredient, pbw | C | D | E |
| Polyol 2 | 100 | 100 | 100 |
| ASF | 50 | 50 | 50 |
| Melamine | 50 | 50 | 50 |
| L-540 | 1.4 | 1.4 | 1.4 |
| Catalyst 1 | 0.32 | 0.32 | 0.32 |
| Catalyst 3 | 0.12 | 0.12 | 0.12 |
| Catalyst 2 | 0.20 | 0.20 | 0.20 |
| Water | 2.4 | 2.4 | 2.4 |
| R-11A | 8.0 | 8.0 | 8.0 |
| TDI-80 | 30.3 | 30.3 | 30.3 |
| Isocyanate Index | 110 | 110 | 110 |
| Processing | | | |
| Cream Time, sec. | 10 | 10 | 10 |
| Rise Time, sec. | 240 | 240 | 240 |
| Properties | | | |
| Appearance | shrinkage | fine | fine |
| Foam Density, kg/m³ | NA | 57.5 | 60.5 |
| CFD(psi) 25% | NA | 1.0 | 1.4 |
| 50% | NA | 1.5 | 2.0 |
| 65% | NA | 2.4 | 3.3 |
| Sag Factor | NA | 2.4 | 1.7 |
| Butler Chimney, % wt. retained | NA | 98.6 | 98.6 |
| Bashore Rebound | NA | 25 | 25 |

EXAMPLE III

This example illustrates the effect of ammonium sulfate as a flame retardant in flexible polyurethane foams. Table III below sets forth the ingredients and the physical properties.

TABLE III

| | Formulation | | |
|---|---|---|---|
| Ingredient, pbw | F | G | H |
| Polyol 2 | 100 | 100 | 100 |
| ASF | 100 | 60 | 40 |
| L-540 | 1.4 | 3.0 | 3.0 |
| Catalyst 1 | 0.32 | 0.4 | 0.4 |
| Catalyst 3 | 0.12 | 0.2 | 0.2 |
| Catalyst 2 | 0.20 | 0.40 | 0.40 |
| Water | 2.4 | 2.4 | 2.4 |
| R-11A | 8.0 | 8.0 | 8.0 |
| TDI-80 | 30.3 | 30.3 | 30.3 |
| Isocyanate Index | 110 | 110 | 110 |
| Processing | | | |
| Cream Time, sec. | 40 | 30 | 20 |
| Rise Time, min/sec. | 10' | 3/30 | 2/45 |

TABLE III-continued

| Ingredient, pbw | Formulation | | |
|---|---|---|---|
| | F | G | H |
| Tack Free Time min/sec. | Long | Long | Long |
| Foam Appearance | Good | 5% Shrinkage | Good |
| Properties | | | |
| Foam Density, pcf. | 7.00 | 4.61 | 3.21 |
| kg/m$^3$ | 112.0 | 68.0 | 52.0 |
| Limited Oxygen Index ASTM D-2863 | 30.3 | 28.2 | 24 |
| Butler Chimney Test, % wt. retained | 91 | 48 | 0 |

From the above it is to be appreciated that at least about 50 parts of sulfate per 100 parts of resin must be present to impart flame retardency.

EXAMPLE IV

A series of flexible foams were prepared from sufficient isocyanates. Table IV below sets forth the ingredients and the foam formulations.

TABLE IV

| Ingredient, pbw | Formulation | | |
|---|---|---|---|
| | I | J | K |
| Polyol 1 | 100 | 100 | 100 |
| ASF | 100 | 100 | 100 |
| L-540 | 3.0 | 3.0 | 3.0 |
| Catalyst 1 | 0.4 | 0.4 | 0.4 |
| Catalyst 3 | 0.3 | 0.3 | 0.4 |
| Catalyst 2 | 0.4 | 0.4 | 0.4 |
| Water | 2.4 | 2.4 | 2.4 |
| R-11A | 8.0 | 8.0 | 8.0 |
| TDI-80 | 30.3 | 26.3 | 0 |
| Isocyanate 2 | 0 | 6.57 | 50 |
| Isocyanate Index | 110 | 110 | 110 |
| Processing | | | |
| Cream Time, sec. | 45 | 40 | 40 |
| Rise Time | Slow | Slow | Slow |
| Properties | | | |
| Shrinkage | No | Yes | No |
| Limited Oxygen Index | 31.8 | 31.8 | 30.0 |
| Butler Chimney % wt. retained | 89 | 50 | 89 |

While the individual and blended isocyanates showed high limited oxygen values, only the single component isocyanate exhibited excellent weight retention.

EXAMPLE V

A series of overpacked molded flexible foams were prepared in a closed mold maintained at 90° C. and were retained in the mold for 15 minutes. Table V below sets forth the formulation and the observed physical properties.

TABLE V

| Ingredient, pbw | Formulation | | | |
|---|---|---|---|---|
| | L | M | N | O |
| Polyol 1 | 100 | 100 | 100 | 100 |
| ASF | 100 | 100 | 100 | 100 |
| Ba(OH)$^2$ | 20 | — | — | — |
| Mg(OH)$^2$ | — | 20 | — | — |
| Al(OH)$^2$ | — | — | 20 | 20 |
| L-540 | 3.0 | 3.0 | 3.0 | 3.0 |
| Catalyst 1 | 0.32 | 0.40 | 0.40 | 0.40 |
| Catalyst 3 | 0.12 | 0.40 | 0.40 | 0.40 |
| Catalyst 2 | 0.20 | 0.40 | 0.40 | 0.40 |
| Water | 2.4 | 2.4 | 2.4 | 2.4 |
| R-11A | 8.0 | 8.0 | 8.0 | 8.0 |
| TDI-80 | 30.3 | 30.3 | 30.3 | 30.3 |
| Isocyanate Index | 110 | 110 | 110 | 110 |
| Processing | | | | |
| Foam Density, pcf | NA | 14.3 | 20.8 | 17.4 |
| Butler Chimney, % wt. retention | — | — | 99 | 99 |

The so-prepared foams exhibited excellent flame retardance.

EXAMPLE VI

A series of flexible foams were prepared wherein the polyol, flame retardant, surfactant and catalyst were admixed and pre-heated in an oven over an extended period. Table VI below sets forth the foam formulation and the results.

TABLE VI

| Ingredient, pbw | Formulation | | | | | | |
|---|---|---|---|---|---|---|---|
| | P | Q | R | S | T | U | V |
| Polyol 2 | 100 | 100 | 100 | 100 | 100 | 100 | 100 |
| ASF | 100 | 100 | 100 | 100 | 100 | 100 | 100 |
| Mg(OH)$_2$ | — | 20 | — | 20 | — | 20 | — |
| Ba(OH)$_2$ | — | — | 20 | — | 20 | — | 20 |
| L-540 | 3.0 | 3.3 | 3.0 | 3.0 | 3.0 | 3.0 | 3.0 |
| Catalyst 1 | 0.2 | 0.2 | 0.2 | 0.2 | 0.2 | 0.2 | 0.2 |
| Catalyst 3 | 0.2 | 0.2 | 0.2 | 0.2 | 0.2 | 0.2 | 0.2 |
| Catalyst 2 | 0.1 | 0.1 | 0.1 | 0.1 | 0.1 | 0.1 | 0.1 |
| Water | 2.4 | 2.4 | 2.4 | 2.4 | 2.4 | 2.4 | 2.4 |
| R-11A | 8.0 | 8.0 | 8.0 | 8.0 | 8.0 | 8.0 | 8.0 |
| TDI-80 | 30.3 | 30.3 | 30.3 | 30.3 | 30.3 | 30.3 | 30.3 |
| Isocyanate Index | 110 | 110 | 110 | 110 | 110 | 110 | 110 |
| Properties | | | | | | | |
| Cream Time, sec. | 55 | 20 | 15 | 20 | 15 | 20 | 18 |
| Rise Time, min/sec. | 15/43 | 4/50 | 5/18 | 4/38 | 5/30 | 4/40 | 5/20 |
| Oven Cure Temp. Pretreatment, Time, Hrs. | 50 | 50 | 50 | 50 | 50 | 50 | 50 |
| 50° C. Oven | 0 | 0 | 0 | 18 | 18 | 0 | 0 |
| Room Temp. | 0 | 0 | 0 | 0 | 0 | 18 | 18 |
| Properties | | | | | | | |
| Density, pcf. Calif. 117, Sec. A, Part-I | 4.0 | 4.7 | 3.6 | 4.2 | 3.7 | 4.4 | 4.5 |

TABLE VI-continued

| | Formulation | | | | | | |
|---|---|---|---|---|---|---|---|
| | P | Q | R | S | T | U | V |
| After Flame, sec. | 0 | 2 | 16 | — | — | — | — |
| After Glow, sec. | 0 | 0 | 0 | — | — | — | — |
| Char Length, in | 0.22 | 0.18 | 2.9 | — | — | — | — |

The California Test is one which simulates actual fire conditions and the excellence of the foams render these conditions is evident from the data. Also, by pre-heating the polyol, the rise time is increased, as well as by permitting the polyol with the sulfate dispersed therein to stand prior to use.

EXAMPLE VII

This example illustrates the preparation of a rigid polyurethane foam in accordance herewith. In an open container, maintained at ambient conditions, the polyol, surfactant, fire retardant, and catalyst were admixed with the isocyanate and water. Table VII below tabulates the formulation and the resulting physical properties.

TABLE VII

| Ingredient, pbw | Formulation |
|---|---|
| Polyol 3 | 100 |
| ASF | 100 |
| Ba(OH)$_2$ | 20 |
| Catalyst 1 | 2.0 |
| Catalyst 2 | 0.3 |
| DC 193[1] | 1.5 |
| R-11A | 28.0 |
| Isocyanate 3 | 90.0 |
| Isocyanate Index | 105 |
| Processing | |
| Cream Time, sec. | 30 |
| Rise Time, sec. | 45 |
| Free Time, sec. | 58 |
| Properties | |
| Foam Density, pcf | 3.4 |
| California 117, Sec. A, Part-1 | |
| After Flame, sec. | 0 |
| After Glow, sec. | 0 |
| Char Length, in | 0.25 |
| Butler Chimney Test | |
| % wt. retained | 70 |

[1] a silicone surfactant.

The data shows that an excellent flame retardant rigid foam can be obtained from the practice of the present invention It is to be appreciated from the preceding that flame retardant isocyanate-based foams can be achieved hereby, especially with respect to polyurethane foams. The foams produced hereby are close-celled products which, if desired, can be either closed or open molded.

In addition, the ammonium sulfate flame retardant, with or without the weakly basic powder, can be used, alone, or in conjunction with other flame retardants.

Having, thus, described the invention what is claimed is:

1. A flame retardant for a foam product prepared from an isocyanate and a polyhydric compound consisting essentially of an admixture of:
   (a) ammonium sulfate powder present in an amount ranging from from about 50 parts to about 150 parts by weight per 100 parts by weight of the polyhydric compound and
   (b) a cyanuric acid derivative selected from the group consisting of cyanamide, melamine, guanidine and biguanidine and mixtures thereof and present in an amount ranging from about 5 parts to about 100 parts by weight per 100 parts of ammonium sulfate.

2. The flame retardant of claim 1 wherein the foam prepared from an isocyanate and a polyhydric compound is a polyurethane foam.

3. The flame retardant of claim 1 wherein the foam prepared from an isocyanate and a polyhydric compound is a rigid polyurethane foam.

4. The flame retardant of claim 1 wherein the foam prepared from an isocyanate and a polyhydric compound is an polyisocyanurate foam.

5. The flame retardant of claim 1 wherein the foam prepared from an isocyanate and a polyhydric compound is a urethane-modified polyisocyanurate foam.

* * * * *